United States Patent
Demoulin et al.

(10) Patent No.: US 8,040,992 B2
(45) Date of Patent: Oct. 18, 2011

(54) METHOD OF TRANSMITTING TIME INFORMATION WITH FIXED LATENCY

(75) Inventors: Vincent Demoulin, Montfort sur Meu (FR); Olivier Mocquard, Rennes (FR); Franck Thudor, Rennes (FR); Bernard Denis, Saint Senoux (FR)

(73) Assignee: Thomson Licensing, Boulogne-Billancourt (FR)

( * ) Notice: Subject to any disclaimer, the term of this patent is extended or adjusted under 35 U.S.C. 154(b) by 998 days.

(21) Appl. No.: 11/701,074

(22) Filed: Feb. 1, 2007

(65) Prior Publication Data

US 2007/0263755 A1    Nov. 15, 2007

(30) Foreign Application Priority Data

Feb. 8, 2006    (FR) .................................... 06 50440

(51) Int. Cl.
  *H04L 7/00* (2006.01)
(52) U.S. Cl. ........ 375/363; 375/372; 375/371; 375/370; 375/362; 375/354; 375/357; 375/358; 375/359
(58) Field of Classification Search .................. 375/372, 375/371, 370, 362, 363, 354, 357, 358, 359
See application file for complete search history.

(56) References Cited

U.S. PATENT DOCUMENTS

| 5,596,581 | A  * | 1/1997  | Saeijs et al. ................... 370/394 |
| 5,966,387 | A  * | 10/1999 | Cloutier ........................ 370/516 |
| 7,548,565 | B2 * | 6/2009  | Sull et al. ...................... 370/503 |
| 7,664,145 | B2 * | 2/2010  | Akamatsu et al. ............ 370/516 |
| 2002/0168042 | A1* | 11/2002 | Miyoshi et al. ................ 375/354 |
| 2004/0264511 | A1* | 12/2004 | Futch et al. .................... 370/535 |
| 2005/0036521 | A1* | 2/2005  | Kim et al. ...................... 370/517 |
| 2005/0190797 | A1  | 9/2005  | Elliot |
| 2006/0062200 | A1* | 3/2006  | Wang et al. ................... 370/352 |

FOREIGN PATENT DOCUMENTS

DE    102 60 807 A1    7/2004

OTHER PUBLICATIONS

Search Report dated Jun. 26, 2006.

* cited by examiner

*Primary Examiner* — Chieh M Fan
*Assistant Examiner* — Siu Lee
(74) *Attorney, Agent, or Firm* — Robert D. Shedd; Jeffrey M. Navon

(57) ABSTRACT

The invention relates to a method of transmitting time information relating to the clock of the source of a sending part consisting in using a fixed latency indicator signal to authorize the source to insert time information used to slave the clock of the decoder of the associated receiving part to its clock.

7 Claims, 2 Drawing Sheets

METHOD OF TRANSMITTING TIME INFORMATION WITH FIXED LATENCY

FIELD OF THE INVENTION

This application claims the benefit, under 35 U.S.C. §119 of French Patent Application 0650440, filed Feb. 8, 2006.

The invention relates to a method of transmitting time information in a data burst (bursty) link by a sending part of a digital communication system, intended for the reconstruction of the images by a decoder.

More particularly, the invention relates to video links, where time information necessary for the reconstruction of the images by the decoder is regularly inserted.

PRIOR ART

Digital communication systems use bursty links to transport data between sender and receiver, with bursts grouped together to form frames of fixed or variable length. The structure of such a bursty framed link is represented by FIG. 1. Each frame (Frame#1, Frame#2) therefore groups together several data bursts (Burst#1, Burst#2, Burst#3) which can be of fixed or variable length and which begin with a header 1 known to the receiver.

The bursts contain, in addition to the useful data to be transmitted, information data relating to the link grouped together in the preambles 2 and midambles 3 of each frame. The insertion of this information data is one cause of the delays, also called latencies, that affect the bursty links. The difference between the maximum and minimum latencies of a link is called jitter.

Consequently, in the case of a continuous link, the latency of the link being constant, the jitter is zero.

However in a bursty framed link, the jitter is in principle not zero because the data to be transmitted can be inserted at any moment and particularly when link-specific information is sent in the headers, preambles or midambles.

The architecture of a system affected by the invention is represented by FIG. 2.

The sending part comprises a source S and a sender E. The source S delivers the data to be transmitted to the sender E. The sender has a multi-layer structure and comprises in particular a medium access control layer (MAC layer) and a physical layer (PHY layer) the medium access control layer (MAC layer) is responsible for creating the data bursts and for their sending time. The physical layer (PHY layer) is responsible for channel coding and modulation of the data formatted by the MAC layer.

The clocks $T_{src}$ pacing the source S, and $T_{tx}$ pacing the sender E, are asynchronous and the data delivered by the source can arrive at any moment at the input of the sender and in particular when the MAC layer or the PHY layer inserts data specific to them (header, preamble, midamble). As indicated previously, this is one cause of the jitter that affects the bursty links.

The receiver R also comprises a medium access control layer (MAC layer) responsible for the reception of the data bursts and a physical layer (PHY layer) responsible for channel decoding and demodulation of the data. The data is therefore extracted from the bursts by the receiver R then delivered to the decoder D where it is decoded.

At the receiver end, the clocks of the receiver $T_{rx}$ and of the decoder $T_{dec}$ are also asynchronous.

Now the clock of the decoder $T_{dec}$ needs to be slaved to that of the source $T_{src}$ to be able to make correct use of the data sent by the latter.

To ensure this synchronization, the source inserts into the data time information relating to its clock (or to put it more simply, it regularly transmits the time of its clock). Using this information, the decoder can slave its own clock to that of the source that generated the data.

For the clock of the decoder to be able to be synchronized on that of the source, it is therefore essential for the time information transmitted by the source to be received by the decoder with zero jitter.

Currently, two types of technique are employed to transmit such information with zero jitter over a bursty link.

They consist either in adding a memory block (buffer) to the receiver in order to absorb the time jitter of the link, or in modifying (restamping) the time information sent by the source in order to take account of the variability of the transmission time.

In the case of the so-called "buffer" type technique, that is, the technique consisting in placing the data bursts in memory, the data is always written into the memory (FIFO) at the pace at which it arrives. Reading can be done either at the initiative of the physical layer which then delivers the data bursts to the video decoder at a perfectly regular pace, or at the initiative of the video decoder which uses its clock as a basis for asking the physical layer for a burst when it considers it necessary.

The major problem with this technique lies in the size of this memory block. In practice, to be effective, this memory block needs to be dimensioned in such a way that it can compensate the maximum jitter of the link. If the jitter is great, then the size of the memory is great. The latency of the link becomes constant and equal to the maximum time needed for the transmission.

The so-called "restamping" type technique is based on the calculation of a time reference. At the moment when the data burst containing the time information arrives at the sender, the latter notes the time on its clock and inserts this time in the transmitted data. When the time information of the source arrives at the receiver, the time of arrival is recorded and the transmission duration is then calculated by simply working out the difference between the time of arrival and the time of departure. The time information transmitted by the source to the decoder is then modified (restamped) taking into account the transmission duration. The decoder then has a reliable time reference to slave its own clock to that of the source.

The main difficulty with this restamping technique consists in slaving the clock of the receiver to that of the sender in order for the calculation of the transit time to be correct. This entails implementing a digital PLL (phase-locked loop) at the receiving end which complicates this block. Furthermore, the time data, having to pass regularly between the sender and the receiver (in addition to that coming from the source) to ensure this synchronization, generates surplus data on the link and consequently a slight drop in its overall capacity.

The invention seeks to remedy these drawbacks.

SUMMARY OF THE INVENTION

The invention is a method of transmitting time information relating to the clock of a source, intended for the reconstruction of the images, in a data burst framed link. A binary control signal, fixed latency data indicator, is sent by the sender associated with the source, and time information data is inserted by the source following the reception of this signal.

The invention has the advantage of guaranteeing the transmission of all the time information relating to the clock of the source with a fixed latency, in a bursty link which in principle exhibits a non-zero jitter.

Preferably, the images are reconstructed at the level of a receiving part associated with the sender and the time information data is used to slave the clock of the decoder of the receiving part to that of the source.

Preferably, the data having a fixed latency is data transmitted in the header of the frame. It can also be data temporarily not disturbed by the insertion of preamble or midamble.

Preferably, the source delays the generation and the insertion of the absolute time data until the reception of the binary control signal corresponding to the authorization to insert.

Preferably, in systems with automatic repetition, the source inserts time data having a fixed latency accompanied by a new time information signal after a time information request associated with the reception of the fixed latency binary signal corresponding to the authorization to insert.

The invention also relates to an asynchronous data interface device between the source and the sender of a sending part of a digital communication system which comprises a so-called decoupling memory enabling asynchronous data to be exchanged. The device also comprises at least one scheduler element for sending to the source fixed latency indicator information, in order for it to transmit fixed latency time data relating to the clock of the source.

This invention makes it possible not to increase the average latency of the link by adding a receive buffer for example.

Preferably, the fixed latency time data is intended for the reconstruction of the images by a decoder by enabling the clock of the decoder ($T_{DEC}$) to be slaved to that of the source.

It also makes it possible to avoid synchronizing the clock of the receiver with that of the sender because it is only necessary for the reconstruction of the images by a certain quantity of transmitted data, for the clock of the decoder to be synchronized with that of the source. Implementing the latter is therefore greatly simplified.

BRIEF DESCRIPTION OF THE DRAWINGS

The characteristics and advantages of the invention mentioned above, and others, will become more clearly apparent from reading the description that follows, given in relation to the appended drawings, in which.

DESCRIPTION OF THE PREFERRED EMBODIMENTS

To be able to make correct use of the data sent by the source, the clock of the decoder has to be slaved to that of the source. It is therefore necessary for the time information transmitted by the source to be received by the decoder with a zero jitter, so as to be absolutely reliable.

Figure 1:
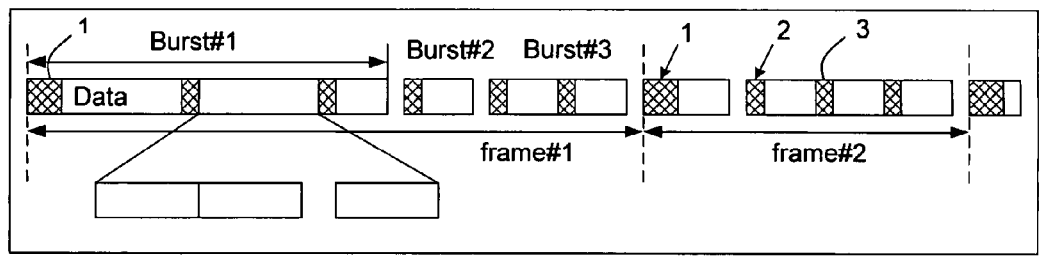
FIG. 1, already described, represents the time structure of a bursty framed link.
Figure 2:
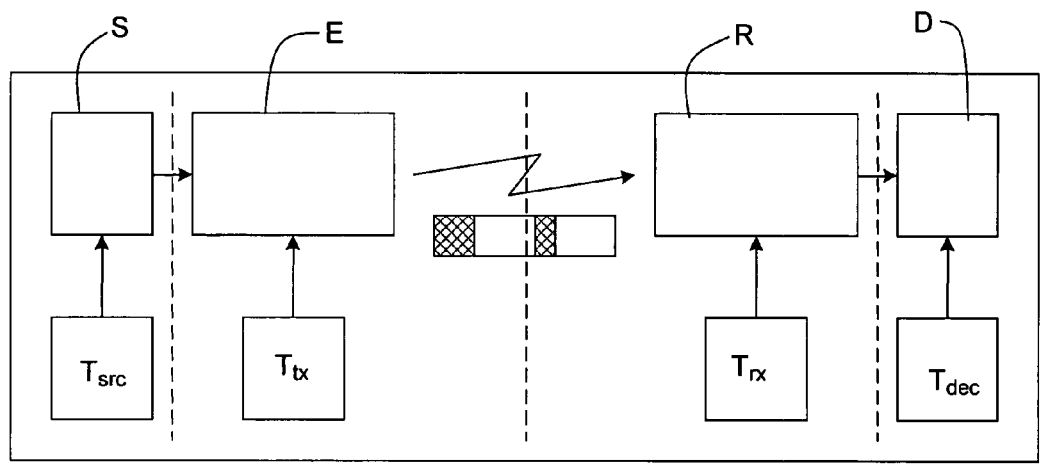
FIG. 2, already described, represents the architecture of a system affected by the invention.
Figure 3:
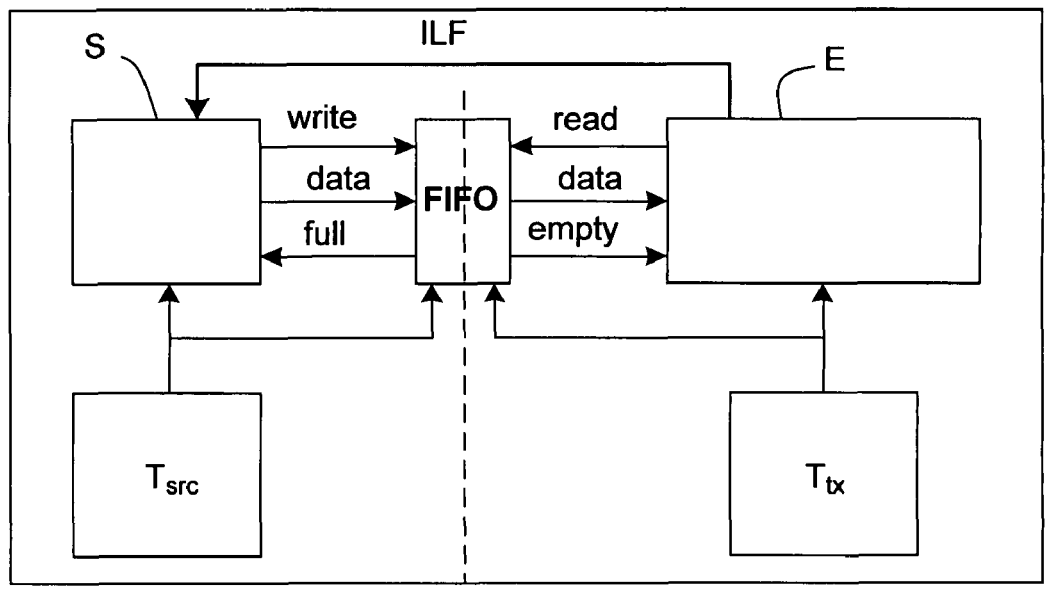
FIG. 3 shows a possible implementation of the inventive method.

FIG. 3 shows a possible exemplary implementation of the inventive method.

Conventionally, the exchanges between the source S and the sender E are conducted using a so-called decoupling buffer memory, for example a so-called FIFO (First-In, First-Out) memory. Such decoupling memories are characterized by the decoupling of the clock domains concerning the writing and reading of the data. After a write signal has been sent, the data from the source is written into the memory at the rate given by the source clock $T_{SRC}$. The sender will have access to the data stored in the buffer memory by generating a read signal. There is also a buffer memory filling indication. In practice, if the memory is full, a memory full indication is sent to the source which will no longer be able to send data.

Similarly, the sender receives an empty notification when there is no information in the memory. The writing and the reading of the data are done asynchronously because the source clock $T_{src}$ is applied to the buffer memory so as to write the data at the pace of that clock and the sender clock $T_x$, asynchronous with the source clock, paces the read.

On a bursty link, some data bursts, known from the sender, in particular from the MAC layer, are transmitted with a perfectly fixed latency. In this case, the delay between the reading and the writing of the data is a known and fixed parameter. The sender can notify the source of this. To transmit this information, a sender source link is created via which a binary control signal giving the fixed latency indication ILF is sent. This signal informs the source of the times at which it is possible to send critical time information, with a perfectly fixed latency, without risk that it will be disturbed.

Such is the case, on a bursty framed link, of the data transmitted in the header of the frame, or of data transmitted with no additional delay due to the addition of preambles or midambles.

Following the reception of this fixed latency indication, all the time information relating to the clock of the source will therefore be transmitted with a fixed latency.

Using this information, the decoder can slave its own clock $T_{DEC}$ to that of the source $T_{SC}$ which generates the data and the clock of the decoder is thus synchronized to that of the source.

The fixed latency indicator signal does not pass through the FIFO memory. When the source wants to transmit critical time data, it therefore checks the possibility of this by using the information delivered by this signal.

If it is not possible, the generation and the sending of this data is delayed until the sender delivers an indication favourable to this transfer.

The sender must take account of the size of the FIFO memory and therefore know it in order to correctly generate the indication signal. In this embodiment, it is therefore preferable to implement the FIFO memory in the part including the sender rather than in that of the source.

The number of data bursts transmitted with a fixed latency must be sufficient for the source to be able to regularly send its time information. The decoder then remains synchronized and, because of this, the use of the data transmitted by the source is not disturbed.

This invention is perfectly applicable to the case of a video link between a source comprising, for example, an encoder or a dedicated storage element (video server) and a video decoder responsible for decoding the stream before it is transmitted or displayed on a screen.

If the coder is, for example, of MPEG (Moving Picture Experts Group) type, the critical time information to be transmitted is known by the name of PCR (Program Clock Reference) burst.

Various examples of extensions of this invention can be envisaged particularly when the link is bi-directional. In this case, the clocks of the source and of the decoder remain synchronized. The new source, associated with the initial decoder, for the "return" link uses the clock of the latter and therefore remains synchronized with that of the new decoder associated with the initial source.

The source regularly transmits time information specific to itself using the mechanism described in the invention. The decoder then compares this time information with that which is specific to it, calculates the correction to be applied to the clock of the source and transmits this information to it using the return channel of the system. There is no constraint applied to this return channel. The adjustment information transmitted by the decoder can support a time jitter without the slaving mechanism being affected.

Figure 4:
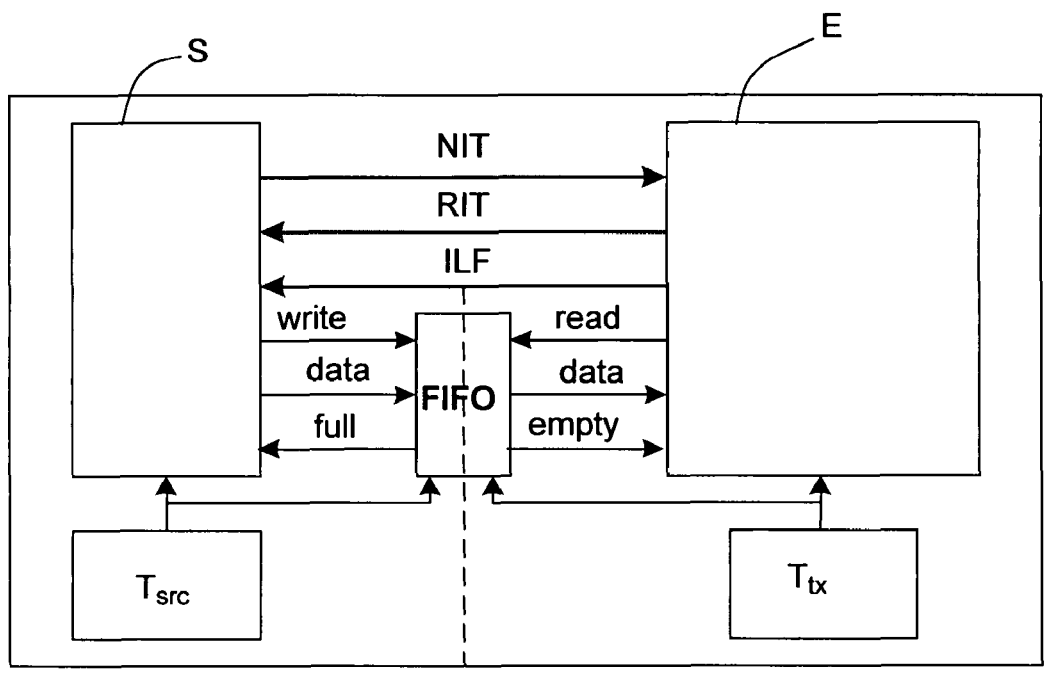
FIG. 4 is an example of another implementation of the invention.

Another example concerns systems with integrated ARQ (Automatic ReQuest for repetition) protocols. They are used for error-free data transmission. FIG. 4 is an example of such an implementation of the invention.

In the case of a bi-directional bursty link, the automatic request for repetition (ARQ) system put in place strongly contributes to the overall jitter of the link. In practice, repeating data leads to an increase in jitter. The sender must not authorize the source to transmit critical time information only when the data burst which will transport it is not involved in the automatic request for repetition (ARQ) system. It is then deactivated for such particular data.

Another possibility consists in authorizing the source to transmit critical time information when the data burst which will transport it will be coded with a more robust channel coding. The probability of correct reception without having to use a repetition phase is then increased.

If a repetition is requested and it is not possible to disable this repetition, the same time information is transmitted several times. A mechanism for disabling it on reception is put in place in order for it not to disturb the slaving.

Either way, and as descried by FIG. 4, an exchange mechanism making it possible to exchange time information is set up. According to the principle of the example described previously with FIG. 3, a source clock $T_{src}$ paces the writing of the decoupling memory, for example a FIFO type memory. The clock $T_x$ of the sender, asynchronous with the clock $T_{src}$, paces the reading of the data from the memory. The principle of the invention is, following a request from the sender for time information RIT (time information request) and on reception of the signal conveying the fixed latency information ILF, for the source to send new time information NIT relating to its clock, in order to ensure the transmission of valid information.

Other examples of implementation of the invention can be envisaged, for which a synchronization of several systems is envisaged by the transmission of fixed latency time data.

The invention claimed is:

1. Method of transmitting time information in a data comunication system comprising a sending part with a source and a sender and a receiving part with a receiver and a decoder, the time information being transmitted from the source, the time information relating to a clock of the source, the time information being intended for the reconstruction of images by the decoder, the time information being transmitted in a data burst framed link, wherein it comprises the steps of:
    sending a binary control signal from the sender to the source a fixed latency indication, which informs the source of a moment at which it is possible to send the time information with a fixed latency, and
    sending from the source to the decoder the time information following reception of the fixed latency indication so that the decoder slaves its own clock to the clock of the source; wherein the fixed latency is a time delay between reading and writing of a memory.

2. Method of transmitting time information according to claim 1, wherein the images are reconstructed at level of the receiving part associated with the sender.

3. Method of transmitting time information according to claim 1, wherein time information data having a fixed latency is data transmitted in a header of a data burst frame.

4. Method of transmitting time information according to claim 1, wherein time information data having a fixed latency is data temporarily not disturbed by insertion of preamble or midamble.

5. Method of transmitting time information according to claim 1, wherein the source delays generation and insertion of a time information data having a fixed latency until the reception of the binary control signal corresponding to an authorization to insert.

6. Method of transmitting time information according to claim 1, wherein, in systems with automatic repetition, the source inserts time information data having a fixed latency accompanied by a new time information signal after a time information request associated with the reception of the fixed latency binary signal corresponding to an authorization to insert.

7. Digital data communication system comprising a sending part with a source and a sender and a receiving part with a receiver and a decoder, wherein the sending part comprises:
    an asynchronous data interface device between the source and the sender which comprises a decoupling memory enabling asynchronous data to be exchanged between the sender and the source, and
    at least one scheduler element for sending to the source a fixed latency indicator information, which informs the source of the moment at which it is possible to transmit time information with a fixed latency, the time information relating to a clock of the source being transmitted from the source to the decoder following reception of the fixed latency indicator information, enabling a clock of the decoder to be slaved to a clock of the source; wherein the fixed latency is a time delay between reading and writing of the decoupling memory.

* * * * *